United States Patent [19]
Foresi

[11] Patent Number: 5,148,317
[45] Date of Patent: Sep. 15, 1992

[54] DIFFRACTIVE OPTICAL ELEMENT FOR COLLIMATING AND REDISTRIBUTING GAUSSIAN INPUT BEAM

[75] Inventor: James S. Foresi, Brookline, Mass.

[73] Assignee: The United States of America as represented by the Secretary of the Air Force, Washington, D.C.

[21] Appl. No.: 720,150

[22] Filed: Jun. 24, 1991

[51] Int. Cl.$^5$ .................... G02B 27/30; G02B 27/44; G02B 3/08

[52] U.S. Cl. .................... 359/566; 359/641; 359/719; 359/742

[58] Field of Search ............... 359/558, 565, 566, 571, 359/619, 641, 708, 718, 719, 737, 742

[56] References Cited

U.S. PATENT DOCUMENTS

| | | | |
|---|---|---|---|
| 3,526,505 | 9/1970 | Kroemer | 430/1 |
| 3,752,555 | 8/1973 | Klotz | 359/25 |
| 3,953,105 | 4/1976 | Ih | 359/18 |
| 3,970,358 | 7/1976 | Kozma | 359/3 |
| 4,023,904 | 5/1977 | Sheets | 355/132 |
| 4,440,839 | 4/1984 | Mottier | 430/1 |
| 4,637,697 | 1/1987 | Freeman | 359/571 X |
| 4,701,005 | 10/1987 | Noguchi | 359/17 |
| 4,789,977 | 12/1988 | Oudenhuysen et al. | 369/109 |
| 4,846,552 | 7/1989 | Veldkamp et al. | 359/572 |
| 5,058,981 | 10/1991 | Umegaki et al. | 359/641 X |
| 5,073,041 | 12/1991 | Rastani | 372/43 X |

OTHER PUBLICATIONS

Cox, J. Allen, "Binary Optics Offers New Freedom to System Designers", *Laser Focus World*, Aug. 1989, pp. 47–52.

Primary Examiner—Rodney B. Bovernick
Assistant Examiner—David R. Parsons
Attorney, Agent, or Firm—Robert L. Nathans; Donald J. Singer

[57] ABSTRACT

An optical element for producing a collimated output beam having a uniform intensity profile from a highly divergent input beam having a Gaussian intensity profile, the optical element consisting of a single convex-plano lens having a diffractive element etched into the plano side of the single lens in accordance with binary optics technology, the diffraction element being configured to complete collimation of the input beam directed at the convex side of the single lens while at the same time redistributing the input beam to produce a uniform intensity output beam.

8 Claims, 1 Drawing Sheet

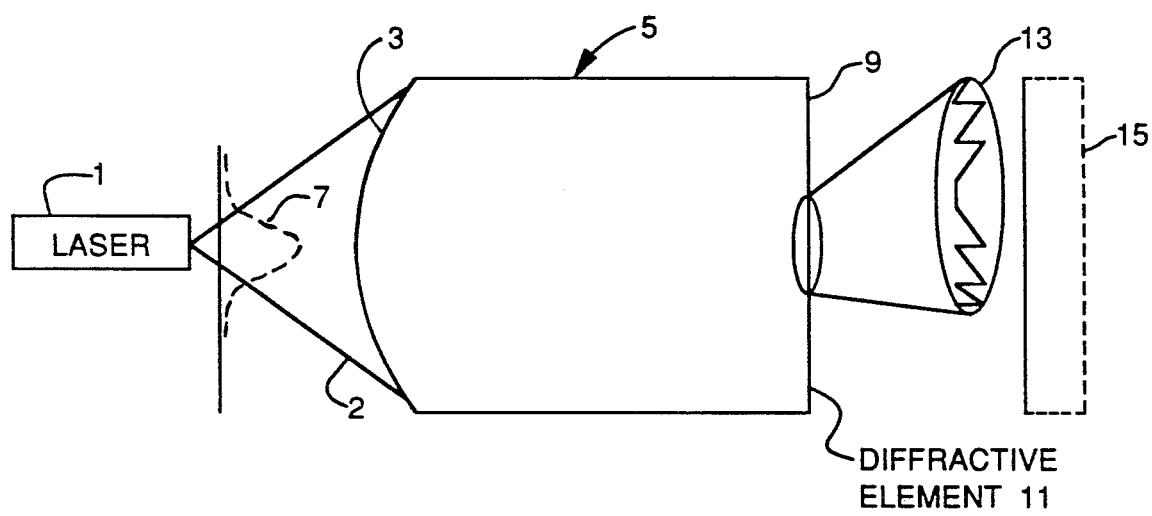

DIFFRACTIVE OPTICAL ELEMENT FOR COLLIMATING AND REDISTRIBUTING GAUSSIAN INPUT BEAM

STATEMENT OF GOVERNMENT INTEREST

The invention described herein may be manufactured and used by or for the Government for governmental purposes without the payment of any royalty thereon.

BACKGROUND OF THE INVENTION

The present invention relates to collimating lenses.

Laser beams inherently have Gaussian intensity profiles and, if the laser source is a semiconductor device, the beam is highly divergent. There is a need for a simple single optical element for performing collimation of the divergent beam and at the same time, redistributing the light beam passing through the optical element from a Gaussian to a uniform intensity profile.

In the past, collimation and redistribution of light intensity have been performed with separate optical elements. Collimation of highly divergent sources required the fabrication of expensive, complicated, aspherical lenses. Also, the beam had to be collimated before intensity redistribution could take place. Additional expensive asphical lenses had to be provided. Computer generated holograms have also been constructed to perform redistribution. Two holograms were provided which are inefficient, and much of the input light intensity was lost due to this inefficiency.

BRIEF SUMMARY OF THE INVENTION

The aforesaid drawbacks of prior art approaches to the problem described above are eliminated by providing a single convex-plano lens with a diffractive element etched into the plano side in accordance with binary optics technology. The invention is useful in connection with redistributing laser light for uniform illumination such as aperture filling for closely packed laser diode arrays or for producing uniform heating.

BRIEF DESCRIPTION OF THE DRAWING

Other objects, features and advantages of the present invention will become apparent upon study of the following description, taken in conjunction with the sole FIGURE, illustrating a preferred embodiment of the invention. A front view of the plano-convex lens having the binary-optic diffraction element etched in the plano surface of the lens is shown.

SPECIFIC DESCRIPTION

As shown in the FIGURE, a highly divergent substantially monochromatic light source such as semiconductor laser 1 projects a divergent light beam 2 at the convex surface 3 of convex-plano lens 5. The beam has a Gaussian distribution indicated at 7. A planar binary optic diffractive element 11 is etched into the flat plano surface 9 of the simple one-piece lens 5. The flatness of surface 9 thus facilitates the etching process.

Convex surface 3 redirects the highly divergent beam 2 of the semiconductor laser 1. Because of the severity of the angle associated with the light incident on lens surface 3, the lens has inherent spherical aberration which redirects some of the high intensity beam from the center of the lens to the low intensity edges. The binary optic surface 11 is thus provided to complete the collimation of the beam.

In the interests of economy and brevity, details of the exact nature of the diffractive binary optic surface 11 will not be described, as the design thereof is within the skill of the worker in this art. Briefly, the diffractive surface 11 is an eight level phase structure which collimates the light with an efficiency of about 95%. The composite lens element 5 redistributes the light to plus or minus 5% of a perfectly uniform intensity profile, schematically shown at 15 in the FIGURE. The eight level diffractive surface profile is also schematically shown at 13 in the FIGURE.

In accordance with binary optics technology, the optical transformation effected by the diffractive element 11 is encoded as a set of lithographic masks. Conventional optical raytrace computer programs produce a wavefront phase map, to in turn create the masks as is known in the art. The generation of the eight level etched planar diffractive surface or corrective lens 11 in the FIGURE, utilizes sequential exposure through a first, second and third photo-lithographic mask, the first mask producing a two phase level structure, the second mask producing four phase levels and the third mask producing an eight phase level structure.

For further details of this process, reference may be made to an article in "Laser Focus World", Aug. 1989, page 47. Reference may also be made to U.S. Pat. No. 4,846,552 issued to Veldcamp et al. and in particular to col.6, lines 32 et seq., describing the generation of planar aspheric lenses using binary optics technology. This patent is incorporated by reference herein.

While preferred embodiments of the present invention have been described, numerous variations will be apparent to the skilled worker in the art, and thus the scope of the invention is to be restricted only by the terms of the following claims and art recognized equivalents thereof.

What is claimed is:

1. An optical element for producing a collimated output beam having a uniform intensity profile from a divergent input beam having a Gaussian intensity profile, said optical element comprising:
    (a) a single convex-plano lens having a convex surface portion for producing a convergent beam from the divergent input beam directed thereat and a flat plano surface portion; and
    (b) binary-optic diffraction means formed within the flat plano surface portion of the single convex-plano lens for collimating the convergent beam produced by said convex surface while at the same time redistributing said input beam to produce a uniform intensity output beam.

2. The optical element of claim 1 wherein the convex side of said single lens introduces spherical aberrations, which are eliminated by said diffractive element.

3. An optical element for producing a collimated output beam having a uniform intensity profile from a divergent input beam having a Gaussian intensity profile, said optical element consisting essentially of:
    (a) a single convex-plano lens having a convex surface portion for producing a convergent beam from the divergent input beam directed thereat and a flat plano surface portion; and
    (b) binary-optic diffraction means formed within the flat plano surface portion of the single convex-plano lens for collimating the convergent beam produced by said convex surface while at the same time redistributing said input beam to produce a uniform intensity output beam.

4. The optical element of claim 3 wherein the convex side of said single lens introduces spherical aberrations, which are eliminated by said diffractive element.

5. A method of producing a collimated output beam having a uniform intensity profile from a highly divergent input beam having a Gaussian intensity profile comprising the steps of:
(a) providing an optical element for producing a collimated output beam having a uniform intensity profile from a divergent input beam having a Gaussian intensity profile, said optical element comprising:
(a-1) a single convex-plano lens having a convex surface portion for producing a convergent beam from the divergent input beam directed thereat and a flat plano surface portion; and
(a-2) binary-optic diffraction means formed within the flat plano surface portion of the single convex-plano lens for collimating the convergent beam produced by said convex surface while at the same time redistributing said input beam to produce a uniform intensity output beam; and
(b) directing said highly divergent input beam at the convex surface portion of said single plano-convex lens.

6. The method of claim 5 wherein the convex side of said single lens introduces spherical aberrations, which are eliminated by said diffractive element.

7. The method of claim 5 wherein said input beam is produced by a semiconductor laser.

8. The method of claim 6 wherein said input beam is produced by a semiconductor laser.

* * * * *